United States Patent [19]
Okano et al.

[11] Patent Number: 5,913,081
[45] Date of Patent: Jun. 15, 1999

[54] ANTIVIBRATION DEVICE HAVING SHIELDING MEMBER TO PREVENT INFLUX OF DAMAGING MATERIAL

[75] Inventors: Hiroshi Okano; Akira Katayama, both of Tokyo, Japan

[73] Assignee: Nikon Corporation, Tokyo, Japan

[21] Appl. No.: 08/968,511

[22] Filed: Nov. 12, 1997

Related U.S. Application Data

[63] Continuation of application No. 08/503,209, Jul. 17, 1995, abandoned.

[30] Foreign Application Priority Data

Jul. 18, 1994 [JP] Japan ................................ 6-165511

[51] Int. Cl.$^6$ ............................ G02B 27/00; G03B 17/00
[52] U.S. Cl. ........................... 396/55; 359/513; 359/611; 348/208
[58] Field of Search ............................ 396/52–55, 439; 359/513, 600, 601, 611, 612; 348/207, 208

[56] References Cited

U.S. PATENT DOCUMENTS

| 5,034,762 | 7/1991 | Kohmoto | 354/195.12 |
| 5,115,350 | 5/1992 | Tanaka | 359/611 X |

FOREIGN PATENT DOCUMENTS 6-3727  1/1994  Japan .

*Primary Examiner*—Safet Metjahic
*Assistant Examiner*—J. K. Han

[57] ABSTRACT

An antivibration device includes a correcting optical system to correct shake by moving at least a part of a photographic optical system, a support member to support the correcting optical system, and a lens mount member to support the shake correction mechanism. A shielding member is further provided on at least either the support member or the lens mount member so as to keep dust and other potentially damaging airborne material from entering the shake correction mechanism. The shielding member is provided so as to extend substantially parallel to the optical axis of the photographic optical system.

2 Claims, 4 Drawing Sheets

PRIOR ART

ANTIVIBRATION DEVICE HAVING SHIELDING MEMBER TO PREVENT INFLUX OF DAMAGING MATERIAL

This application is a continuation, of application Ser. No. 08/503,209, filed Jul. 17, 1995, now abandoned.

BACKGROUND OF THE INVENTION

1. Field of the Invention

The present invention relates to an antivibration device for correcting a hand shake, and particularly to an antivibration device which is used in a photographing apparatus, such as a camera, for detecting a hand shake occurring in a photographing operation and correcting the hand shake by moving a part of the photographing optical system.

2. Related Background Art

The hand shake occurs when the photographer holds the photographing apparatus by his or her hand to take a picture. The hand shake spoils the quality of the picture to be taken. The hand shake is liable to occur especially when a lens having a long focal length is used, or when the shutter speed of the lens is slow.

FIG. 7 is a view for explaining the whole structure of an ordinary antivibration device according to the conventional art.

Referring to FIG. 7, reference numeral 31 denotes an interchangeable lens system, and 32 a camera body. The optical system of the interchangeable lens 31 is comprised of a fixed lens group L11, a focusing lens group L12 which moves in the direction of the optical axis I to perform a focusing operation, and a shake correcting lens group L13 (shake correcting optical system) which shifts in a direction substantially perpendicular to the direction of the optical axis I to correct a shake.

A shake directing unit 33 is comprised of a velocity sensor, or an angular velocity sensor, etc., so as to output a shake detection signal in response to a detected vibration in the direction perpendicular to the optical axis of the camera. This shake detecting unit 33 is provided within the interchangeable lens system 31 in FIG. 7. The shake correcting unit 34 constitutes a shift mechanism so as to shift the shake correcting lens group L13 on a plane substantially perpendicular to the optical axis I.

The shake control unit 35 is provided within the interchangeable lens system 31, and has a memory portion which stores lens information on focal length or the like and information related to the shake correction. The shake control unit 35 controls drive of the shake correcting unit 34 on the basis of the information stored in said memory portion and an output from the shake detecting unit 33 mentioned above so as to perform the shake correction.

The antivibration device requires a predetermined space in order to secure a range for correction (a shift range) of the shake correcting lens group L13. For an antivibration device of the conventional type, there is a possibility of dust, etc., entering the blur correcting unit 34 from such space. Dust, etc., enter this space, for example, when accessories to the camera, such as a photographing lens, are interchanged in a photographing apparatus of an interchangeable type, such as a single lens reflex camera, or when films, or the like, are exchanged in a photographing apparatus of a non-interchangeable type, such as a lens shutter camera. When dust or the like enters, any of the driving units may be damaged.

In Japanese Patent Application Laid-Open No. 6-3727, there was disclosed an image shake correction apparatus with a lens supporting frame for supporting a correction optical system, and a light-shielding member for shielding from light a space generated between said lens supporting frame and a fixed frame which movably supports said lens supporting frame on a plane perpendicular to the photographing optical axis. However, since this light-shielding member was arranged to prevent leakage of light from the front side of the optical axis, the dust, etc., entering from the rear side of the optical axis, as mentioned above, could not be prevented.

SUMMARY OF THE INVENTION

Therefore, an object of the present invention is to provide an antivibration device which can prevent dust, or the like, from entering from the vicinity of the correcting optical system.

In order to solve the above object, the antivibration device according to a first embodiment of the present invention is comprised of a correcting optical system (L3) for performing a shake correction by shifting at least a part of the photographing optical system, a supporting member (13) for supporting said correcting optical system, a shake correction mechanism (4) for performing the shake correction by driving said correcting optical system, and a lens mount member (6) for supporting the shake correction mechanism, and is characterized in that a shielding member (6f-1, 6f-2, 14f, 13a, or 6f-5) is provided at least on either the supporting member or said lens mount member.

According to a second embodiment of the invention, the shielding member shields a space in which the shake shielding mechanism is provided on the inner side of the lens mount member, in the antivibration device of the first solving means.

According to a third embodiment, said shielding member is provided in a stop mechanism (14) provided in the lens mount member, in the antivibration device of the first embodiment.

According to a fourth embodiment, the shielding member has the diameter substantially the same as that of the correcting optical system and is provided in the direction of the optical axis, in the antivibration device of the first embodiment.

According to a fifth embodiment, the shielding member has the diameter substantially the same as that of the movable range of the correcting optical system and is provided so as to partly overlap with the correcting optical system in the direction of the optical axis, in the antivibration device of the first embodiment.

According to a sixth embodiment, the shielding member has a form along the movable range of the correcting optical system and is provided so as to partly overlap with the correcting optical system in the movable direction thereof, in the antivibration device of the first embodiment.

The antivibration device of the present invention comprises the shielding member so as to cover the range for correction (movable range) of the correcting optical system.

BRIEF DESCRIPTION OF THE DRAWINGS

FIGS. 1 to 6 are views showing embodiments according to the present invention, in which:

FIG. 1 is a cross sectional view showing the structure of a first embodiment;

FIG. 2 is a partially-enlarged view of the first embodiment;

FIG. 3 is a partially-enlarged view of a second embodiment;

FIG. 4 is a partially-enlarged view of a third embodiment;

FIG. 5 is a partially-enlarged view of a fourth embodiment;

FIG. 6 is a partially-enlarged view of a fifth embodiment; and

DETAILED DESCRIPTION OF THE PREFERRED EMBODIMENTS

Embodiments of the present invention will be fully described below with reference to the drawings.

[First Embodiment]

Figure 1:
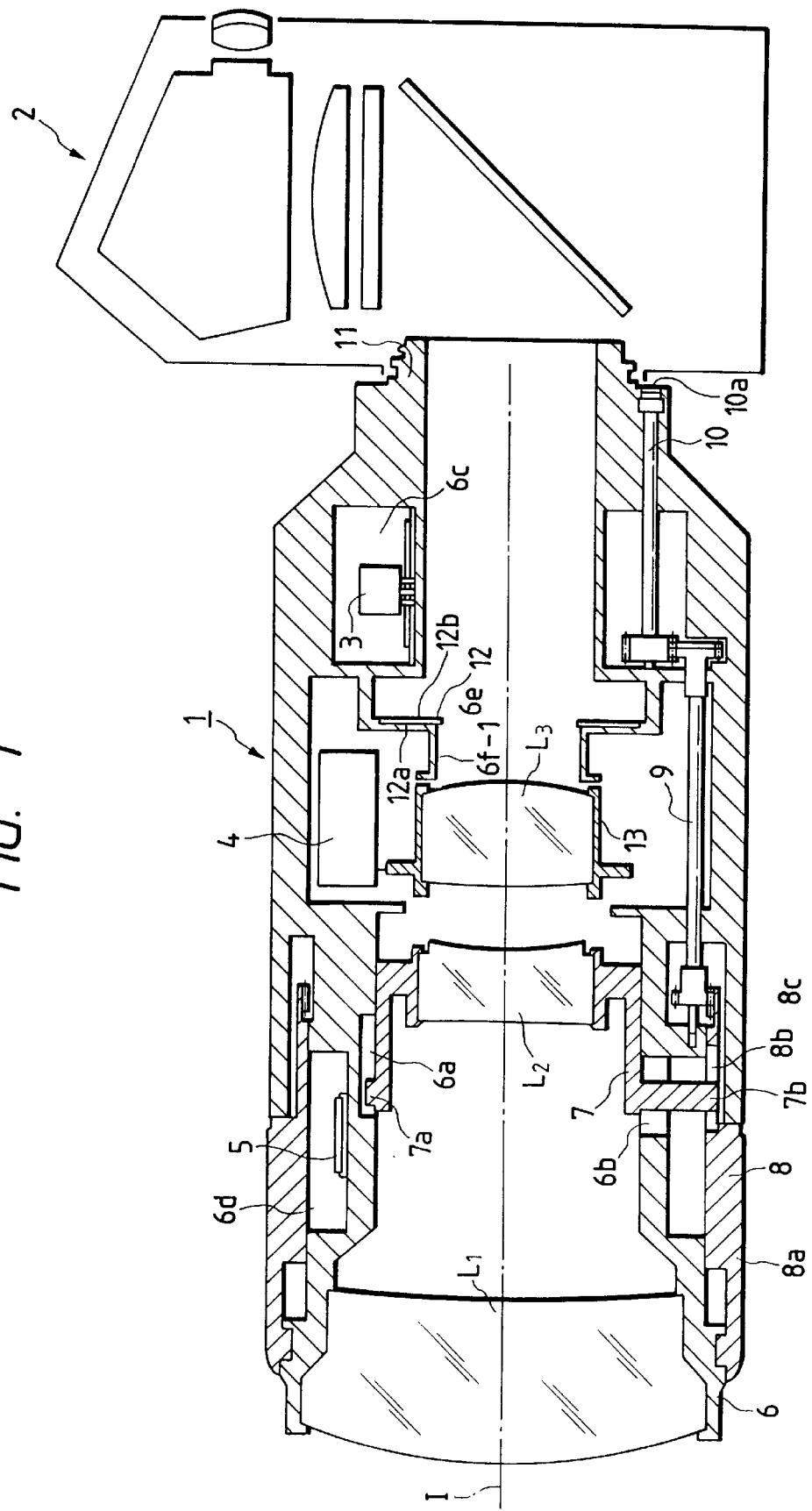

FIG. 1 is a cross-sectional view showing the structure of an interchangeable lens system 1 of an antivibration device according to the first embodiment of the present invention. Note that, though lens groups L1, L2 and L3 are represented by one lens in the figure for simplifying the description, they may be constituted by a plurality of lenses.

Referring to FIG. 1, a fixed lens mount 6 supports the fixed lens group L1 with the front end portions thereof. A support frame 7 of the focusing lens group L2 is movably fitted in the inner diameter of the fixed lens mount 6 in the direction of the optical axis I. On the inner side of this fixed lens mount 6, there are formed a straight guide groove 6a and a relief 6b arranged along the direction of the optical axis I. A focus drive ring 8 is fitted in the outer periphery of the fixed lens mount 6, and the outer periphery 8a thereof is exposed on the outer periphery of the lens mount 1. By handling this outer periphery 8a, the focus drive ring 8 functions as a manual focusing ring.

A straight guide portion 7a, a focus guide portion 7b, and the like are formed on the support frame 7. The straight guide portion 7a is engaged with the straight guide groove 6a of the fixed lens mount 6, and the focus guide portion 7b is engaged with a lead groove 8b of the focus drive ring 8 through the relief 6b of the fixed lens mount 6.

A gear 8c is provided on the rear end portion of the focus drive ring 8. This gear 8c is meshed with gears 9 and 10 for auto-focus driving. The rear end portion 10a of the gear 10 takes the form of a coupler, and is engaged with an unrepresented coupler on the camera body side to transmit the driving force for the auto-focusing.

This auto-focusing operation will be described here. When the coupler of the camera body 2 is rotated, the focus drive ring 8 is also rotated through the gears 10, 9 and 8c. On this occasion, the focus guide portion 7b is engaged with the lead groove 8b, and the straight guide 7a is engaged with the straight guide groove 6a. Accordingly, the support frame 7 is moved to the direction of the optical axis I along the lead groove 8b without being rotated. With movement of this support frame, the focusing is adjusted.

When a manual focusing is conducted, the outer periphery 8a of the focus drive ring 8 is rotated manually, whereby the support frame 7 is moved in the same manner as described above.

On the rear end portion of the fixed lens mount 6, a bayonet structure is formed. An electric contact 11 is also formed on the rear end portion of the lens mount 6. The electric contact 11 is, while the lens mount 6 being loaded on the camera body 2, connected to an unrepresented electric contact on the body side. This electric contact 11 is arranged to transmit a signal between the camera and the interchangeable lens and to supply the power source.

The stop diaphragm mechanism 12 comprises a stop diaphragm blade 12a and a stop diaphragm driving ring 12b. A projection of the stop diaphragm blade 12a is engaged with a cam groove provided on the stop diaphragm driving ring 12b, and also with a hole 6e provided on the fixed lens mount 6. Accordingly, when the stop diaphragm driving ring 12b is rotated, the stop diaphragm blade 12a is driven so as to change a stop diaphragm aperture.

A shake detecting unit 3 is stored in a space 6c arranged in the fixed lens mount 6. A shake control unit 5 is stored in a space 6d arranged in the fixed lens mount 6. A shake correcting unit 4 is connected to the support frame 13 of the shake correcting lens group L3.

When a photograph is to be taken, this interchangeable lens system 1 is loaded on the camera body 2. When a hand shake occurs at the photographing operation, the shake is corrected in the following process. The hand shake is detected by the shake detecting unit 3, and the shake detecting unit 3 outputs a detection signal indicating the detected hand shake. This detection signal is sent to the shake control unit 5, and the shake control unit 5 controls the shake correcting unit 4 on the basis of said detection signal so as to perform the shake correction.

Figure 2:
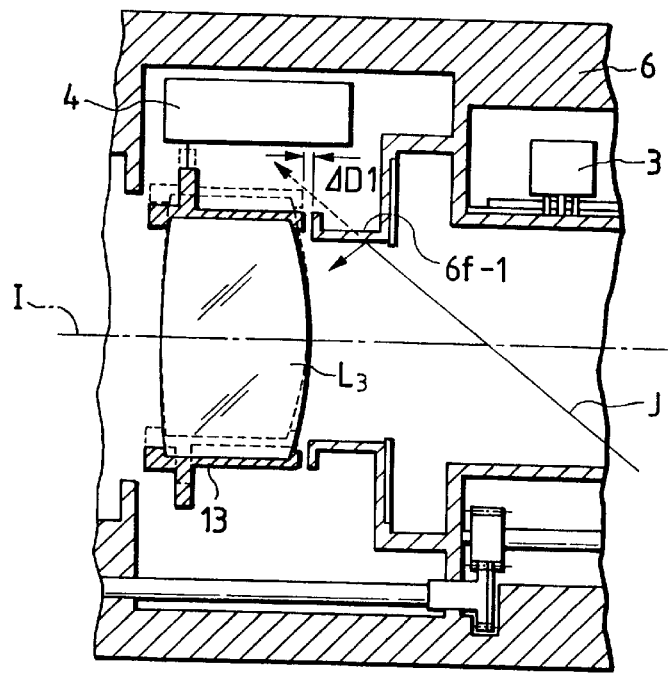

FIG. 2 is a partially-enlarged view showing an antivibration device according to the first embodiment.

A shielding projection 6f-1 is arranged on the side of the stop mechanism 12, and is positioned on the fixed lens mount 6 near the optical axis I. The shielding projection 6f-1 is fixed to the fixed lens mount 6. The shielding projection 6f-1 is formed in a tubular form along the direction of the optical axis I. The shielding projection 6f-1 is provided with a projection arranged on the side of the shake correcting lens group L3 and projecting outwardly from the optical axis I. This shielding projection 6f-1 covers a space of the fixed lens mount 6 between the shake correcting lens group L3 and the stop mechanism 12. This space is formed in a substantially tubular form by a part of the fixed lens mount 6, the support frame 13, and the shake correcting lens L3. Inside this space, a correction mechanism 4 and a mechanism portion of the lens support frame 13 which is in contact with said correction mechanism 4 are housed. The above-mentioned shielding projection 6f-1 covers this space in such a manner that it shields the space from a space on an opening side on the rear end side of the interchangeable lens system 1. A broken line between the lens group L3 and the support frame 13 indicates a position of the shake correcting optical group L3 after it moves in the direction perpendicular to the optical axis I to perform the shake correction. The shielding projection 6f-1 is arranged to cover the above-mentioned space when the shake correcting optical group L3 is positioned on the broken line. A gap ΔD1 between the shielding projection 6f-1 and the shake correcting lens group support frame 13 is set to be in a required minimum size. Therefore, this shielding projection 6f-1 can prevent an entering substance which is indicated by the arrow J in the drawing.

[Second Embodiment]

Figure 3:
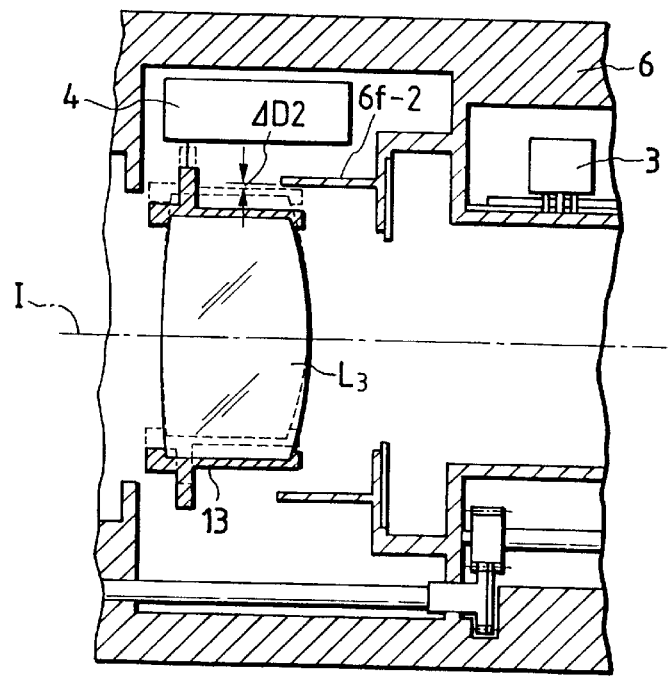

FIG. 3 is a partially-enlarged view showing an antivibration device according to the second embodiment.

A shielding projection 6f-2 is provided on the fixed lens mount 6 on the side of the stop mechanism 12, in the same manner as the first embodiment. The shielding projection 6f-2 is arranged to be in a tubular form having a large diameter so as to be positioned outer side, compared with the first embodiment, in the direction perpendicular to the optical axis I. Further, it is arranged to overlap with the outer periphery of the shake correcting lens group L3 in the optical axis direction. A broken line indicates a position of the shake correcting optical group L3 after it moves in the direction perpendicular to the optical axis I to perform the shake correction. The shielding projection 6f-2 is arranged to cover the abovementioned space portion even when the shake correcting optical group L3 is positioned on the broken line. In other words, the space is covered with the shielding projection 6f-2 and the lens support frame 13. A gap ΔD2 between the shielding projection 6f-2 and the shake correcting lens group support frame 13 is set to be in a required minimum size.

In the second embodiment, unlike in the first embodiment, the inner diameter of the shielding projection 6f-2 can be set to be large, and moreover, flare which is caused by light reflected in the inner diameter of the shielding projection 6f-2 can be prevented.

However, on a side opposite to the side onto which the shake correcting optical group L3 has been driven (the lower part of the drawing), the gap becomes large so that the shielding effect is poorer than that in the first embodiment, and the space for storing the shake correcting unit 4 becomes narrower. Thus, either embodiment can be selected, taking the above-mentioned advantages into consideration.

[Third Embodiment]

Figure 4:
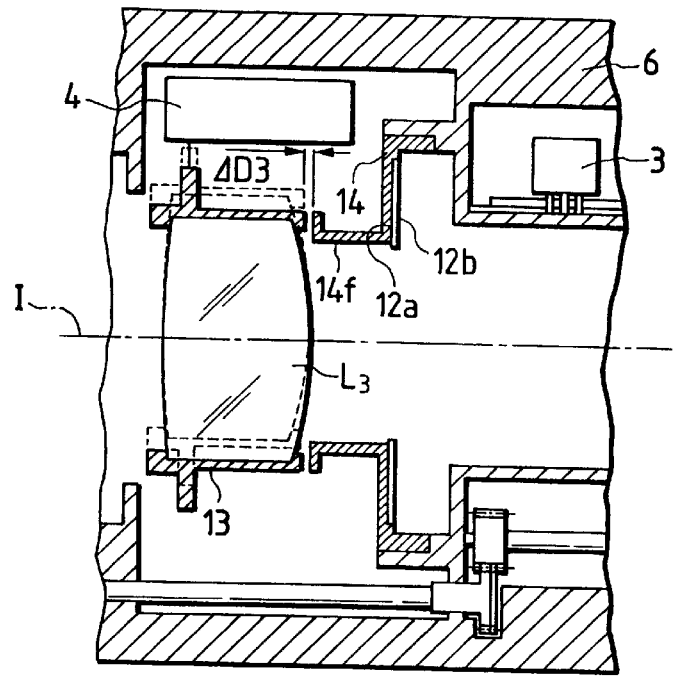

FIG. 4 is a partially-enlarged view showing an antivibration device according to the third embodiment.

The third embodiment is different from the first and second embodiments in that a shielding projection 14f is not provided on the fixed lens mount 6, but on a stop diaphragm support frame 14.

The stop diaphragm support frame 14 is a frame for supporting the stop diaphragm blade 12a, the stop diaphragm driving ring 12b, and the like. The stop diaphragm driving ring 12b is engaged with an unrepresented stop lever on the camera body side. When this stop lever is driven, the stop diaphragm driving ring 12b is rotated and the stop diaphragm blade 12a is also driven, thereby changing the stop aperture. The stop aperture can be adjusted, depending on an angular position at which the stop diaphragm support frame 14 is mounted on the fixed lens mount 6.

The shielding projection 14f is provided on the stop diaphragm support frame 14 in such a manner that it covers a space between the shake correcting lens group L3 and the stop diaphragm mechanism 12. That is, the shielding projection 14f is formed in a tubular shape and the rear end of said shielding projection 14f is fixed to the stop support frame 14 at a position near the optical axis I. The shielding projection 14f is provided with a projection arranged on the side of the shake correcting lens group L3 and projecting outwardly from the optical axis I. A broken line indicates a position of the shake correcting optical group L3 after it moves in the direction perpendicular to the optical axis I to perform the shake correction. The shielding projection 14f is arranged to cover the above-mentioned space portion even when the shake correcting optical group L3 is positioned on the broken line. A gap ΔD3, between the shielding projection 14f and the shake correcting lens group support frame 13 is set to be in a required minimum size.

Note that if the positions of the stop driving ring 12b and the stop support frame 14 are reversed and the stop driving ring 12b is arranged on the body side, the shielding projection can be provided on the stop driving ring 12b. In this case, the stop driving ring 12b is preferably made of a material having a small specific gravity in order to reduce the inertia thereof.

[Fourth Embodiment]

Figure 5:
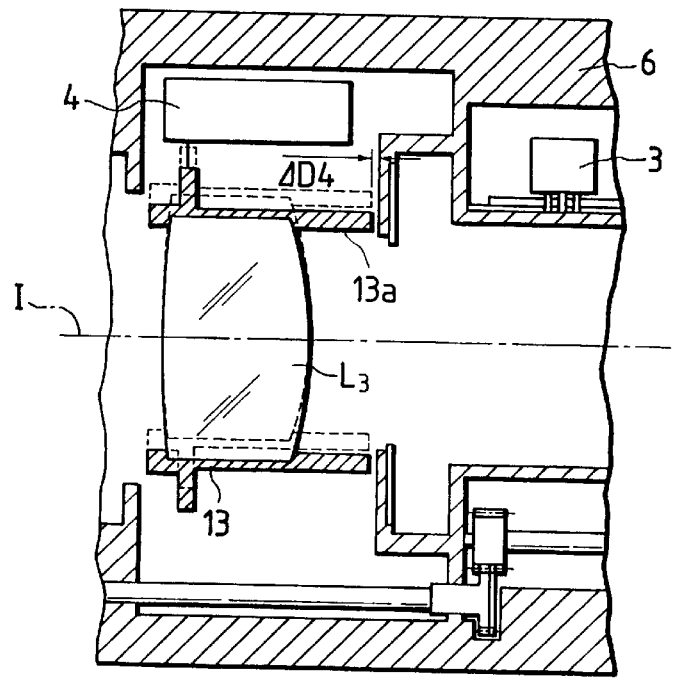

FIG. 5 is a partially-enlarged view showing an antivibration device according to the fourth embodiment.

A shielding projection 13a is arranged to extend from the rear end of the support frame 13 so as to cover a space between the shake correcting lens group L3 and the stop diaphragm mechanism 12. A broken line indicates a position of the shake correcting optical group L3 after it moves in the direction perpendicular to the optical axis I to perform the shake correction. The shielding projection 13a is arranged to cover the above-mentioned space even when the shake correcting optical group L3 is positioned on the broken line. A gap ΔD4 between the projection 13a and the stop diaphragm mechanism 12 is set to be in a required minimum size.

The shielding projection 13a may be formed by the support frame 13 for housing a glass of the shake correcting lens group L3, or may be formed by a pressing ring which is to be screwed in the support frame 13 in order to fix the glass. In either case, the shielding projection 13a is preferably made of a material having a small specific gravity so as to reduce a load on the shake correction. Note that, though in the fourth embodiment the rear end of the shielding projection has no further projection outward the optical axis I, such projection may be arranged like the shielding member 6f-2 in the first embodiment. Thus, even if an amount of movement of the shake correcting lens group L3 in the direction perpendicular to the optical axis caused by the shake correction is increased, the space can be satisfactorily covered.

[Fifth Embodiment]

Figure 6:
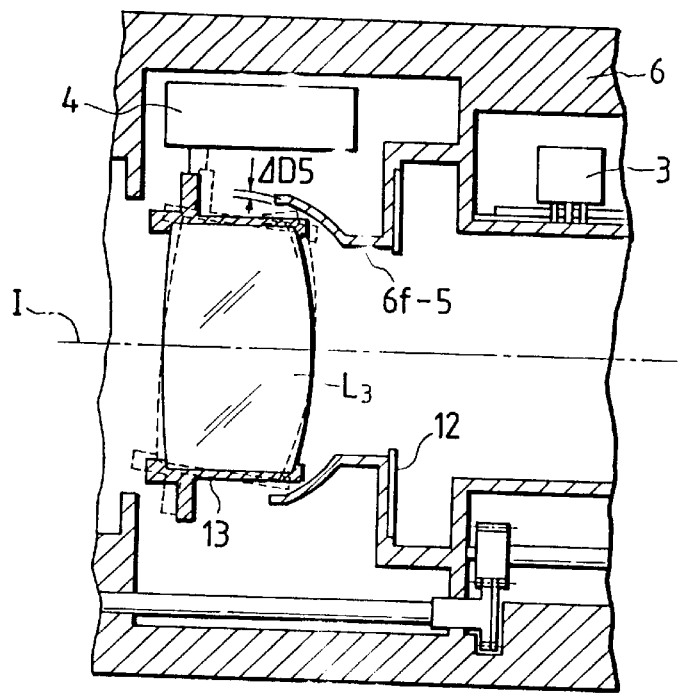
Figure 7:
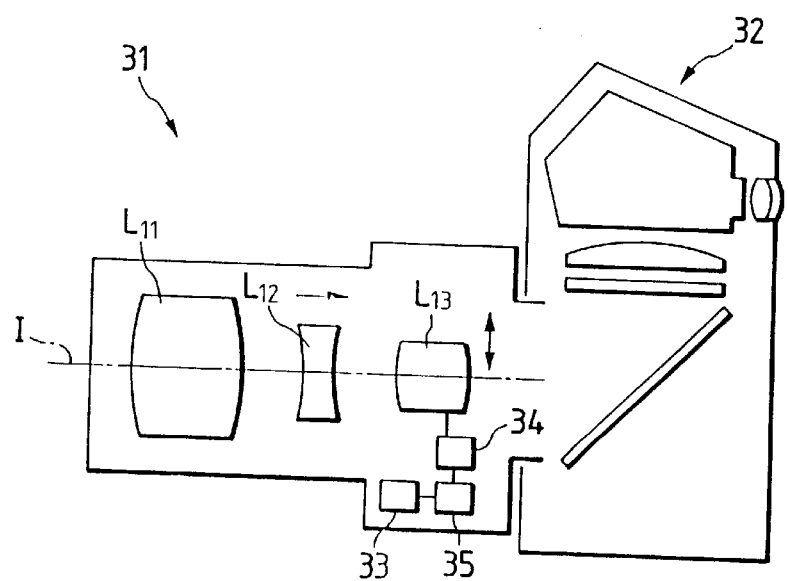
FIG. 7 is a view for explaining the whole structure of an ordinary antivibration device according to the prior art.

FIG. 6 is a partially-enlarged view showing an antivibration device according to the fifth embodiment.

An interchangeable lens system of the fifth embodiment is for the shake correction which is not performed by a movement of the shake correcting lens group L3 in the direction perpendicular to the optical axis, but by a rotation thereof.

The tubular shielding projection 6f-5 is arranged on the fixed lens mount 6 in such a manner that it covers a space between the shake correcting lens group L3 and the stop diaphragm mechanism 12. More specifically, the tubular shielding projection 6f-5 is in a tubular form and expands like a part of a spherical form in such a manner that it does not obstruct the lens group L3 and the lens support frame 13 on the side of the lens group L3 in a range of rotation of the lens group L3. Furthermore, the rear end of the shielding projection 6f-5 is arranged on the lens mount 6 at a position near the optical axis I. A broken line indicates a position of the shake correcting optical group L3 after it rotates to move to perform the shake correction. The tubular shielding projection 6f-5 is arranged to cover the above-mentioned space even when the shake correcting optical group L3 is positioned on the broken line. This tubular shielding projection 6f-5 is formed in an arc, and a gap ΔD5 between the shake correcting lens group L3 and the support frame 13 is set to be in a required minimum size, regardless of the position of the support frame 13.

Like in this fifth embodiment, it is possible to form a proper shielding projection which has an expanded part in compliance with a moving range of the lens frame so that it can be securely shielding and does not obstruct a movement of the shake correcting lens group.

[Other Embodiment]

The present invention is not limited to the embodiments described above, and various modifications or alterations are available for the shielding projection so long as it covers a space containing the shake correction mechanism.

For example, in a shake correcting apparatus in which the shake correcting lens group L3 is rotated to move, like in the fifth embodiment, it is possible to provide the shielding projection in the stop diaphragm mechanism, like in the third embodiment. It is also possible to provide the shielding projection on the support frame 13 of the shake correcting lens group L3, like in the fourth embodiment.

In the present embodiments, the shielding projection is arranged between the shake correcting lens frame and the fixed lens mount, or between the shake correcting lens frame and the stop diaphragm mechanism. However, the present invention is not limited to this arrangement.

Though the present embodiments were described with reference to the interchangeable lens system of the single lens reflex camera, the present invention is feasible in a lens shutter camera. In such a case, the shielding projection may be provided, for example, between the shake correcting lens frame and a shutter member.

Further, the projection may be formed by the shake correcting lens itself, instead of the shake correcting lens frame.

Furthermore, in the lens system 1 of the present embodiments the focusing lens group L2 is arranged in the middle and the shake correcting lens group L3 is arranged on the trailing end thereof. However, the present invention is not limited to such a photographic optical system. The present invention is feasible in an optical system in which a shake correcting lens group is arranged in a middle position of the photographic optical system, and also feasible in a zoom lens system.

Since, in any of the foregoing embodiments, the shielding projection is provided, it is possible to cover the built-in components including the shake correction mechanism 4, which results in the preferable external appearance. Also, since the built-in components are covered, it is not required to improve the external appearance of each component, which results in a reduction of the cost. Further, it is possible to prevent flare which is caused by lights reflected on the built-in components, so as to improve the depicting capability of the photographic optical system. It is also possible to prevent light leakage which may be caused from a cut-away portion of the system in high probability.

Note that, in the second embodiment shown in FIG. 3, an amount of light reflected in the inner diameter of the shielding projection can be decreased.

Also, the shielding member may be used not only for preventing dust or the like entering from the rear end of the shake correcting lens group, but also for preventing water droplets or the like entering from the same direction.

Since an outer space portion of the lens mount has been already formed as a dust-proof structure by the known technology on the front end side of the shake correction mechanism, a shielding projection like that on the rear end side is not required. However, it is preferable that a shielding projection is formed also on the front end side of the shake correction mechanism in order to prevent dusts from moving from the shake correcting lens group L3 side to the focusing lens group L2 side, or conversely, from the focusing lens group L2 side to the shake correcting lens group L3 side. In this case, the shielding projection is preferably formed between the shake correcting lens group L3 or the lens support frame 13 and the lens mount 6 or the focusing lens group L2.

What is claimed is:

1. An antivibration device comprising:

a correcting optical system to correct shake by moving at least a part of a photographic optical system in a movable direction;

a support member to support said correcting optical system;

a shake correction mechanism to correct shake by driving said correcting optical system;

a lens mount member to support said shake correction mechanism; and a shielding member provided on at least one of said support member and said lens mount member, wherein said shielding member extends in a direction substantially parallel to an optical axis of said photographic optical system, and wherein said shielding member has substantially the same diameter as said correcting optical system after movement to compensate for vibration and is provided in such a manner that said shielding member partly overlaps with said correcting optical system in the direction of the optical axis.

2. An antivibration device comprising:

a correcting optical system to correct shake by moving at least a part of a photographic optical system in a movable direction;

a support member to support said correcting optical system;

a shake correction mechanism to correct shake by driving said correcting optical system;

a lens mount member to support said shake correction mechanism; and a shielding member provided on at least one of said support member and said lens mount member, wherein said shielding member extends in a direction substantially parallel to an optical axis of said photographic optical system, and wherein said shielding member is provided in such a manner that said shielding member partly overlaps with said correcting optical system in the movable direction.

\* \* \* \* \*